July 24, 1923.

J. H. GRAVELL 1,462,572

CONDENSING WELDING CIRCUIT

Filed June 25, 1920

Inventor
James H. Gravell
By his Attorneys
Townsend & Decker

Patented July 24, 1923.

1,462,572

UNITED STATES PATENT OFFICE.

JAMES H. GRAVELL, OF ELKINS PARK, PENNSYLVANIA, ASSIGNOR TO THOMSON ELECTRIC WELDING COMPANY, OF BOSTON, MASSACHUSETTS, A CORPORATION OF MASSACHUSETTS.

CONDENSING WELDING CIRCUIT.

Application filed June 25, 1920. Serial No. 391,704.

*To all whom it may concern:*

Be it known that I, JAMES H. GRAVELL, a citizen of the United States, and a resident of Elkins Park, in the county of Montgomery and State of Pennsylvania, have invented certain new and useful Improvements in Condensing Welding Circuits, of which the following is a specification.

My invention relates to that class of electric metal working apparatus in which a transformer having connections to a source of suitable electric energy such for instance as alternating currents, is employed to deliver in a local circuit containing the work a heating electric current of large volume for heating a section of metal in an electric metal working operation such as electric welding, bending, forging, riveting, brazing, upsetting, annealing or other kind of work.

It has been before proposed to employ with apparatus of this character a condenser connected across the terminals of the apparatus to neutralize or counterbalance the effects of the inductive reactance in order to better the power factor and generally increase the efficiency of the machine.

In the previous methods of employing such a condenser the connections are such that the condenser is in operation whether or not the transformer is acting. The object of my present invention is to so employ the condenser as to avoid waste of current during the time that the machine is not in operation and to thereby maintain the circuit, as far as may be, with a unity power factor irrespective of whether the apparatus is in operation (that is "on") or not.

Figure 3:
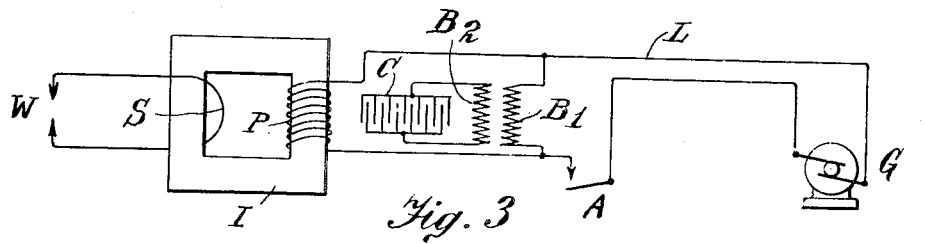

Fig. 3 a modification of my invention.

Figure 1:
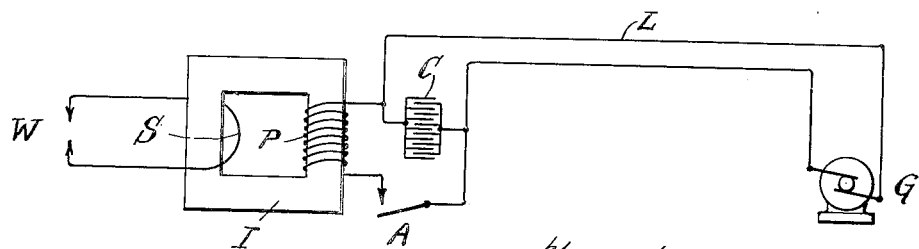
Fig. 1 illustrates diagrammatically the manner heretofore employed of utilizing the neutralizing or compensating condenser in an electric metal working apparatus to improve the power factor.

A typical arrangement of the condenser as heretofore employed to counterbalance the effect of the inductive reactance of the transformer is illustrated in Fig. 1 wherein G is an electric generator, L the power line carrying the alternating currents, P the primary of the power transformer, I the iron core thereof, S the secondary, W the working terminals for the heating part of the apparatus, A any form of operating switch for closing a circuit whereby the apparatus is thrown into operation when the heating effects are desired at the terminals W and C the condenser.

It is evident that with the apparatus organized as shown in this figure, the condenser C is in operation whether or not the power transformer is in operation. As the condenser is used to balance the effect of induction of the circuit, the power factor is only improved by its use, when the inductance is acting, which can only be the case when the circuit is closed. Therefore the system shown in Fig. 1 can only be used to advantage when continuously operated apparatus is connected to the circuit.

The circuit therefore shown in Fig. 1 would be very wasteful of current as it is evident that the condenser current would be flowing irrespective of whether or not the switch A was closed and the machine were in actual operation. Then too the current which would flow while the switch A was open would not be in phase with the generating voltage and the power factor would be bad during the time the machine was out of operation.

According to my present invention I place the condenser on the transformer side of the operating switch so that when the heating operation is being conducted, the reactive inductance and the condensive inductance act in unison, that is, both act at the same time and neither can act without the other.

Figure 2:
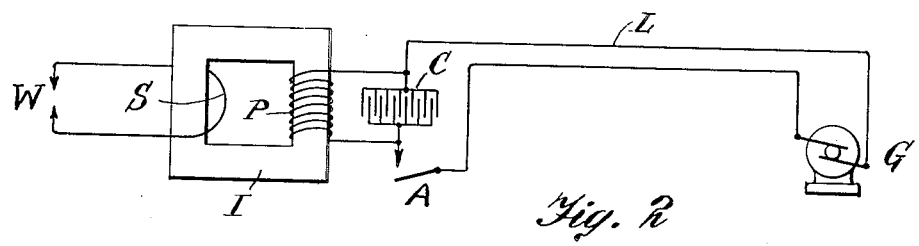
Fig. 2 illustrates diagrammatically my present improvement.

My invention is illustrated in one of its forms in Fig. 2 where it will be noted that the condenser C is placed directly across the terminals of the primary of the transformer but the operating switch A is placed on the line side of the condenser, so that the condenser will be open-circuited by the operation of said switch when opened to stop the operation of the machine in supplying the heating electric current. As is well known, the great inductive reactance occurs in the secondary or heating circuit of the machine and this reactance is reflected in the primary, causing the whole circuit to show a poor power factor.

In a machine used for spot welding the current is "on" only about one-tenth of the time and in a butt welding machine or operation the current is "on" about one-fourth of the time. In the case of a spot welding machine, however, the previous system shown in Fig. 1 will only be efficient for one-tenth of the time and wasteful for nine-tenths of the time, whereas my improved system shown in Fig. 2 will be efficient all the time because no current is wasted during the time that the machine is out of operation.

Fig. 3 illustrates the invention as applied to a case in which the condenser effects are utilized through the intermediary of a transformer used to raise the voltage applied to the condenser acting as before upon the system containing the power factor. In this figure $B^1$ is the primary of the boosting transformer and $B^2$ is the secondary connected to the condenser C. In this system it will be noted that the high voltage generated by the booster and supplied to the condenser is in electrical connection with the line wires across the apparatus but that the action of said condenser only takes place when the heating apparatus is thrown into operation by closing the switch A.

I do not wish to be understood as limiting my invention to the use of static condensers as condensers of any type may be used without departing from my invention.

What I claim as my invention is:

1. The combination with an electric transformer supplying heavy current of low voltage for heating purposes, an operating switch adapted to open and close the connection between the line and the primary of said transformer to control the heating operation and a compensating or counterbalancing condenser placed directly across the terminals of the primary in a connection taken from a connection between the switch and primary, whereby the condenser acts only when the switch is closed for the heating operation, said condenser ceasing to act when the switch is opened to stop the flow of heating current.

2. The combination with an electric heating transformer, of a booster connected across the terminals of the machine, a condenser connected to the booster and an operating or controlling switch on the line side of the booster as and for the purpose described.

Signed at New York in the county of New York and State of New York this 23d day of June A. D. 1920.

JAMES H. GRAVELL.

Witness:
IRENE LEFKOWITZ.